(12) United States Patent
Okita et al.

(10) Patent No.: US 8,294,411 B2
(45) Date of Patent: Oct. 23, 2012

(54) SENSORLESS INDUCTION MOTOR CONTROL DEVICE HAVING FUNCTION OF CORRECTING SLIP FREQUENCY OF MOTOR

(75) Inventors: Tadashi Okita, Minamitsuru-gun (JP); Takahiro Akiyama, Minamitsuru-gun (JP); Tomohisa Tsutsumi, Minamitsuru-gun (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/173,199

(22) Filed: Jun. 30, 2011

(65) Prior Publication Data
US 2012/0013287 A1    Jan. 19, 2012

(30) Foreign Application Priority Data
Jul. 15, 2010   (JP) ................................. 2010-160668

(51) Int. Cl.
   *H02P 27/08* (2006.01)
(52) U.S. Cl. ............... 318/801; 318/727; 318/400.02; 318/802; 318/811; 318/812; 318/779; 318/780; 318/807; 318/823; 318/825; 363/8; 363/10; 363/150
(58) Field of Classification Search .............. 318/727, 318/400.02, 801, 802, 812, 779, 780, 807, 318/823, 825; 363/8, 10
See application file for complete search history.

(56) References Cited

U.S. PATENT DOCUMENTS

| | | | | |
|---|---|---|---|---|
| 7,545,116 B2* | 6/2009 | Nagata et al. | ............ | 318/807 |
| 7,671,558 B2* | 3/2010 | Yamamoto et al. | .......... | 318/802 |
| 8,106,621 B2* | 1/2012 | Sato et al. | .................. | 318/811 |
| 8,174,217 B2* | 5/2012 | Zhang et al. | ............ | 318/400.02 |
| 2011/0194318 A1* | 8/2011 | Kono | ............................ | 363/37 |

FOREIGN PATENT DOCUMENTS

| | | |
|---|---|---|
| JP | 9-191699 | 7/1997 |
| JP | 3067659 | 5/2000 |
| JP | 2008-199881 | 8/2008 |
| JP | 2010-88257 | 4/2010 |

* cited by examiner

*Primary Examiner* — Rita Leykin
(74) *Attorney, Agent, or Firm* — Drinker Biddle & Reath LLP

(57) ABSTRACT

A sensorless induction motor control device with a function of correcting a slip frequency wherein a slip frequency estimation unit estimates the slip frequency from at least one kind of current flowing through the motor. A voltage command value calculation unit calculates a D-phase voltage command value and a Q-phase voltage command value which are used for controlling a voltage applied to the motor using a Q-phase current command value calculated based on a difference between a speed estimation value, which is calculated using an estimation value of the slip frequency, and an externally supplied speed command value. An ideal voltage command value determination unit determines an ideal voltage command value using the speed command value and the Q-phase current command value. An actual voltage command value calculation unit calculates an actual voltage command value using the D-phase voltage command value and the Q-phase voltage command value. and A slip frequency correction unit compares the ideal voltage command value with the actual voltage command value and changes the estimation value of the slip frequency to make it smaller if the actual voltage command value is smaller than the ideal voltage command value.

12 Claims, 5 Drawing Sheets

SENSORLESS INDUCTION MOTOR CONTROL DEVICE HAVING FUNCTION OF CORRECTING SLIP FREQUENCY OF MOTOR

RELATED APPLICATION DATA

This application claims priority under 35 U.S.C. §119 and/or §365 to Japanese Application No. 2010-160668 filed Jul. 15, 2010, the entire contents of which is incorporated herein by reference.

BACKGROUND OF THE INVENTION

1. Field of the Invention

The present invention relates to a control device for controlling a sensorless induction motor by estimating a slip frequency of the motor and estimating a motor speed using the slip frequency instead of detecting the motor speed using a speed sensor.

2. Description of the Related Art

A variety of methods for controlling an induction motor which has no speed sensor are proposed in Japanese Patent No. 3067659 (JP3067659B) for example. In these methods, a slip of the motor is estimated from a value of a current flowing through windings in the motor, an estimated speed of the induction motor is calculated, and feedback control of the induction motor is carried out. A voltage command signal value produced by the feedback control becomes a desired command signal value if speed feedback data used in the feedback control is accurate.

FIG. 1 is a diagram showing a configuration of a sensorless induction motor control device which does not has a function of correcting the slip frequency according to the related art. The sensorless induction motor control device shown in FIG. 1 carries out vector control which independently controls a torque command signal value (IQ command signal value) IQcmd and an excitation command signal value (ID command signal value) IDcmd. When three-phase current feedback from an induction motor 10 is carried out, a three-phase-to-two-phase conversion unit 12 generates current feedback signals IDfb and IQfb by DQ conversion. Then, a voltage command signal value calculation unit 14 generates voltage command signal values VDcmd and VQcmd using a D-phase current feedback signal IDfb, Q-phase current feedback signal IQfb, current command signal value, and excitation frequency command signal value ω1cmd. A current compensator 16 generates an excitation frequency command signal value ω1cmd based on a difference between the IQ command signal value IQcmd and the current feedback signal IQfb. An excitation phase θ is calculated by integrating the excitation frequency command signal value ω1cmd. The two-phase-to-three-phase conversion unit 18 generates a three-phase voltage command signal value by inverse DQ conversion using the voltage command signal value VDcmd, voltage command signal value VQcmd, and excitation phase θ. The induction motor 10 is driven by the three-phase voltage command signal. A slip frequency estimation unit 20 estimates a slip frequency estimation value ωs^, which corresponds to a slip of the induction motor 10, in accordance with an equation ωs^=K×IQfb/IDfb, where K represents a constant. A subtractor 22 calculates a difference between the slip frequency estimation value ωs^ and excitation frequency command signal value ω1cmd. This difference corresponds to the speed estimation value ωr^ of the speed of the induction motor 10. A speed compensator 24 carries out speed control based on a speed command signal value ωrcmd and the speed estimation value ωr^.

In the sensorless induction motor control device shown in FIG. 1, the slip frequency estimation value ωs^ may differ from an actual value of the slip frequency when the speed of the induction motor 10 is high. As a result, the speed estimation value ωr^ will differ from an actual value of the speed of the induction motor 10, the excitation frequency command signal value ω1cmd will differ from an actual value of the excitation frequency, the voltage command signal value will become lower than an ideal value of voltage applied to the induction motor 10, and thus a desired output of the induction motor 10 cannot be obtained.

In other words, when the speed of the induction motor 10 is high, there is an error in the speed estimation value, a current cannot be generated at a desired phase, and thus an output of the induction motor 10 is reduced.

Therefore, an object of the present invention is to provide a sensorless induction motor control device which has a function of correcting a slip frequency, and is capable of improving the output of the motor by detecting error in the speed estimation value and correcting the slip frequency estimation value in an appropriate way.

SUMMARY OF THE INVENTION

According to the present invention, there is provided a sensorless induction motor control device which has a function of correcting a slip frequency comprising: a slip frequency estimation unit for estimating the slip frequency from at least one kind of current flowing through windings included in the motor; a voltage command signal value calculation unit for calculating a D-phase voltage command signal value and a Q-phase voltage command signal value, which are used for controlling a voltage applied to the motor, using a Q-phase current command signal value calculated based on a difference between a speed estimation value, which is calculated using an estimation value of the slip frequency, and an externally supplied speed command signal value; an ideal voltage command signal value determination unit for determining an ideal voltage command signal value using the speed command signal value and the Q-phase current command signal value; an actual voltage command signal value calculation unit for calculating an actual voltage command signal value using the D-phase voltage command signal value and the Q-phase voltage command signal value; and a slip frequency correction unit for comparing the ideal voltage command signal value with the actual voltage command signal value and changing the estimation value of the slip frequency to make it smaller if the actual voltage command signal value is smaller than the ideal voltage command signal value.

Preferably the slip frequency correction unit corrects the estimation value of the slip frequency by multiplying the estimation value of the slip frequency with a ratio of the actual voltage command signal value to the ideal voltage command signal value.

Alternatively, the slip frequency correction unit corrects the estimation value of the slip frequency only when a speed of the motor can be assumed to be identical to the externally supplied speed command signal value.

When the sensorless induction motor is driven at a certain speed, the voltage required for obtaining the desired output of the motor (the ideal voltage command signal value) can be determined from the motor speed (≈the speed command signal value) and the Q-phase current (≈Q-phase current command signal value). If the voltage command signal value is small for such a required voltage, it can be determined that the speed estimation value differs from an actual value of the motor speed. The speed estimation value can be made substantially the same as the actual value by correcting the speed estimation value, which corresponds to the estimation value of the slip, thus the output of the sensorless induction motor can be improved.

BRIEF DESCRIPTION OF THE DRAWINGS

The above object, features, and advantages of the present invention will become more apparent from the following description of the preferred embodiments given in connection with the accompanying drawings, wherein.

DESCRIPTION OF THE PREFERRED EMBODIMENTS

Figure 1:
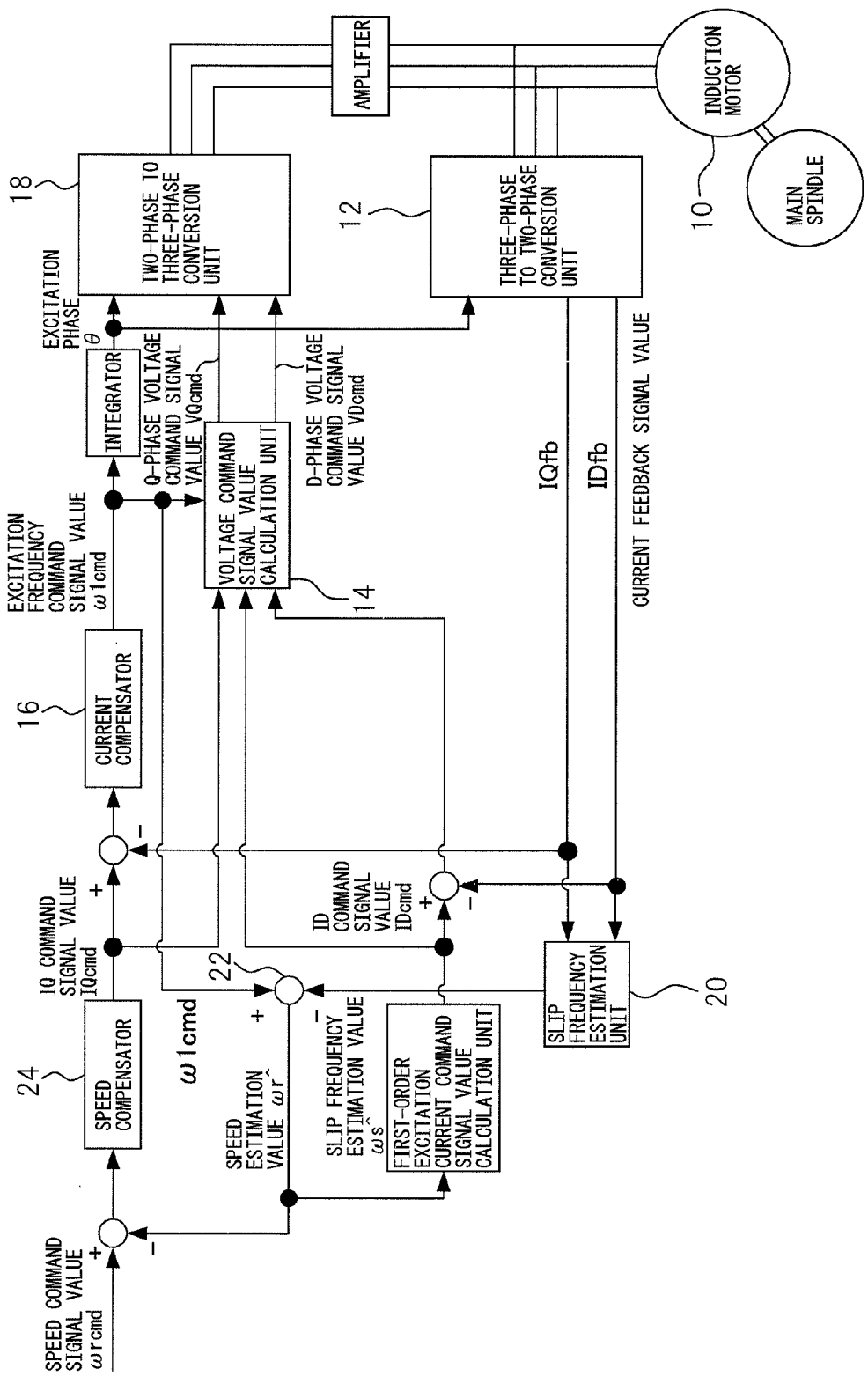
FIG. 1 is a diagram showing a configuration of a sensorless induction motor control device which does not have a function of correcting the slip frequency according to the related art.

Embodiments of the present invention will be described below in detail with reference to the accompanying drawings. In the drawings, identical or similar components are denoted by the same reference numerals.

Figure 2:
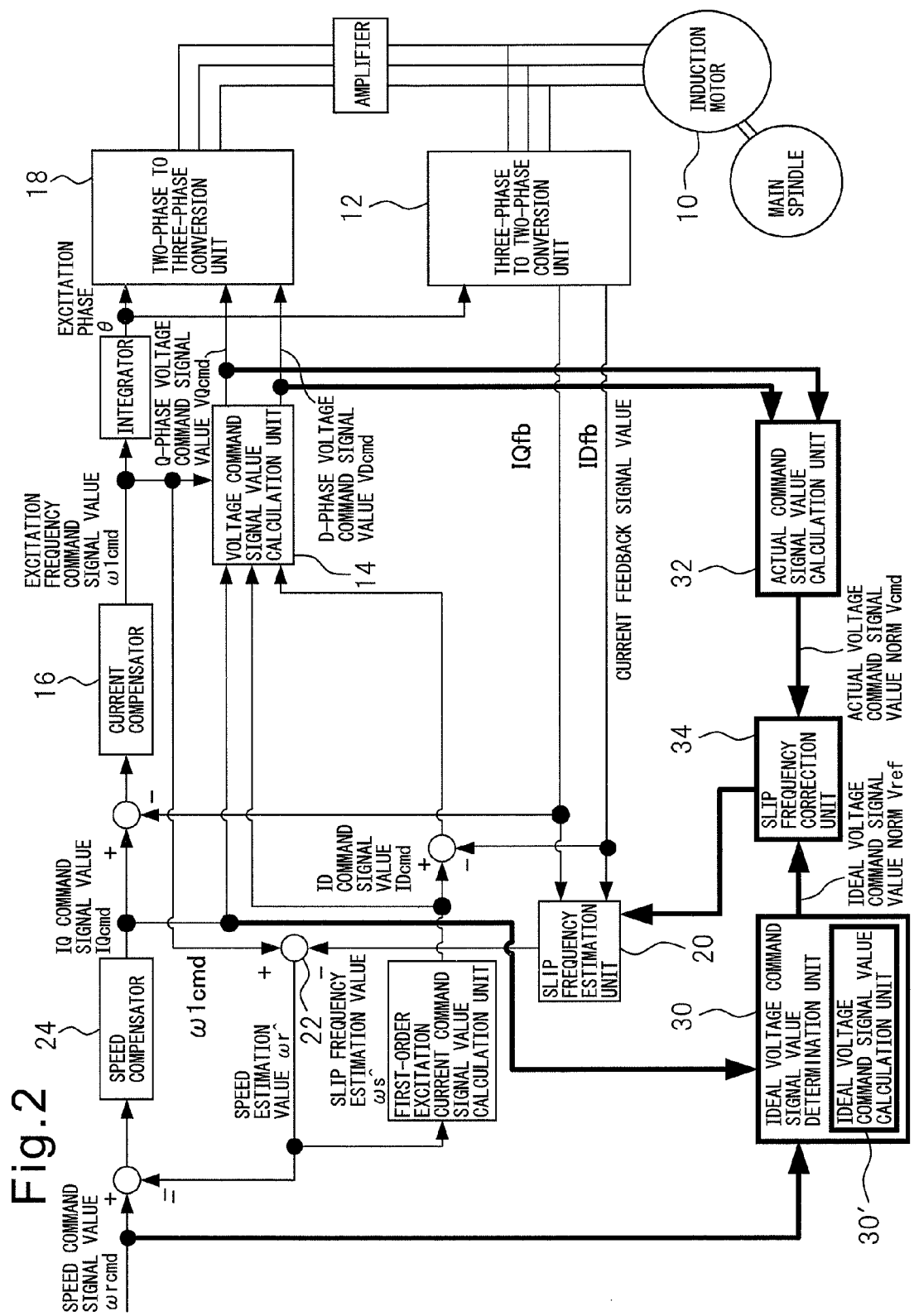
FIG. 2 is a diagram showing a configuration of a sensorless induction motor control device which has a function of correcting the slip frequency according to a first embodiment of the present invention.

Referring to the drawings, FIG. 2 is a diagram showing a configuration of a sensorless induction motor control device which has a function of correcting the slip frequency according to a first embodiment of the present invention.

In vector control, there is the following relationship among the slip frequency $\omega s$, D-phase current value ID, and Q-phase current value IQ:

$$\omega s = R2/L2 \cdot IQ/ID \quad (1)$$

Where, R2 represents a second-order resistance, and L2 represents a second-order reactance. Further, if a motor speed is represented by $\omega r$, an excitation frequency $\omega 1$ is represented as follows:

$$\omega 1 = \omega r + \omega s \quad (2)$$

There are the following relationships among the D-phase voltage VD, D-phase current ID, and excitation frequency $\omega 1$ and among the Q-phase voltage VQ, Q-phase current IQ, and excitation frequency $\omega 1$:

$$VD = R1 \cdot ID - \sigma L1 \cdot \omega 1 \cdot IQ \quad (3)$$

$$VQ = R1 \cdot IQ + L1 \cdot \omega 1 \cdot ID \quad (4)$$

Where, R1 represents a first-order resistance, L1 represents a first-order reactance, and σ represents a leakage coefficient. An ideal voltage command signal value norm Vref can be calculated using the following equation:

$$Vref = \sqrt{(VD^2 + VQ^2)} \quad (5)$$

If the motor speed $\omega r$ equals the motor speed command signal value $\omega cmd$ and the Q-phase current value IQ equals the Q-phase current command signal value IQcmd, equations (1) to (4) can be expressed as the following equations (1)' to (4)'.

$$\omega s = R2/L2 \cdot IQcmd/ID \quad (1)'$$

$$\omega 1 = \omega rcmd + \omega s \quad (2)'$$

$$VD = R1 \cdot ID - \sigma L1 \cdot \omega 1 \cdot IQcmd \quad (3)'$$

$$VQ = R1 \cdot IQcmd + L1 \cdot \omega 1 \cdot ID \quad (4)'$$

Where, there is a characteristic between the D-phase current value ID and the motor speed $\omega r$ (motor speed command signal value $\omega rcmd$) that the D-phase current value ID is constant when the motor speed $\omega r$ equals to or is lower than a base speed of a motor and in that the D-phase current value ID decreases in inverse proportion to the motor speed $\omega r$ when the motor speed $\omega r$ is higher than the base speed. Such a characteristic differs from motor to motor.

Therefore, if storing a table showing the relationship between the motor speed $\omega r$ and the D-phase current value ID or the relationship among the motor speed $\omega r$, the base speed, and a constant in a memory together with circuit coefficients of the motor, the ideal voltage command signal value Vref for the current motor speed, that is, the output of the induction motor 10, can be calculated in accordance with equations (1)' to (4)' and (5). In this case, the motor circuit coefficients include the first-order reactance L1, second-order reactance L2, first-order resistance R1, second-order resistance R2, and leakage coefficient σ. Further, the ideal voltage command signal value Vref is proportional to the output of the induction motor 10, so the ideal voltage command signal value Vref can be calculated using the motor speed command signal value $\omega rcmd$ and the Q-phase current command signal value IQcmd. An ideal voltage command signal value determination unit 30 shown in FIG. 2 has an ideal voltage value calculation unit 30'. The ideal voltage value calculation unit 30' calculates the ideal voltage command signal value norm Vref using the motor speed command signal value $\omega rcmd$ and Q-phase current command signal value IQcmd.

On the other hand, the actual voltage command signal value norm Vcmd which is actually provided to the motor can be calculated using D-phase voltage command signal value VDcmd and Q-phase voltage command signal VQcmd which are output from a voltage command signal value calculation unit 14, as expressed in the following equation (6):

$$Vcmd = \sqrt{(VDcmd^2 + VQcmd^2)} \quad (6)$$

An actual voltage command signal value calculation unit 32 shown in FIG. 2 calculates an actual voltage command signal value norm Vcmd in accordance with equation (6).

When the actual voltage command signal value norm Vcmd is smaller than the ideal voltage command signal value Vref, the slip frequency estimation value $\omega s\hat{}$ estimated in the slip frequency estimation unit 20 is inaccurate. According to the present embodiment, a slip frequency correction unit 34 compares the ideal voltage command signal value norm Vref which is calculated by the ideal voltage command signal value calculation unit 30' with the actual voltage command signal value norm Vcmd which is calculated by an actual voltage command signal value calculation unit 32. If the actual voltage command signal value norm Vcmd is smaller than the ideal voltage command signal value norm Vref, the slip frequency correction unit 34 corrects the slip frequency estimation value ωŝ, which is estimated by the slip frequency estimation unit 20, in accordance with the following equation:

$$CSV' = CSV \cdot (Vcmd/Vref)$$

Where, CSV represents a current estimation value, and CSV' represents a corrected estimation value.

As can be seen from FIG. 2, speed estimation value ωr̂ changes in accordance with the change of the slip frequency estimation value ωŝ. As a result, the change of speed estimation value ωr̂ has an advantageous effect on the excitation frequency ω1cmd, so the desired voltage command signal values VDcmd and VQcmd can be output.

When the induction motor 10 has no load or a low load, the slip of the induction motor 10 is small. Therefore, the difference between an excitation frequency of the induction motor 10 and an actual speed of the induction motor 10 is small, thus the deviation from the speed estimation value ωr̂ is small. The slip increases in accordance with the increase of the load of the induction motor 10. In this case, if the slip cannot be appropriately estimated, the speed estimation value ωr̂ is affected. There is a characteristic between the D-phase current value ID (excitation current) and the motor speed ωr (motor speed command signal value ωrcmd) that the D-phase current value ID is constant when the motor speed ωr is equal to or lower than a base speed of the motor and that the D-phase current value ID decreases in inverse proportion to the motor speed ωr when the motor speed ωr is higher than the base speed. Such a characteristic relates to the slip. Therefore, when the motor speed is high, in other words, when the induction motor 10 has a high load, it is highly probable that the output of induction motor 10 will decrease due to the deviation of the slip frequency estimation value ωŝ.

If a desired output of the induction motor 10 cannot be obtained due to deviation of the slip frequency estimation value ωŝ, the slip becomes excessively large and the voltage applied to the induction motor 10 decreases. The excitation frequency command signal value ω1cmd is reduced by reducing the slip frequency estimation value ωŝ, thus the slip frequency estimation value ωŝ is improved by the transition from an excessive slip status of induction motor 10 to an appropriately operated state of the induction motor 10. As a result, the voltage command signal value is set to an appropriate value, thus the desired output of the induction motor 10 can be obtained.

Figure 3:
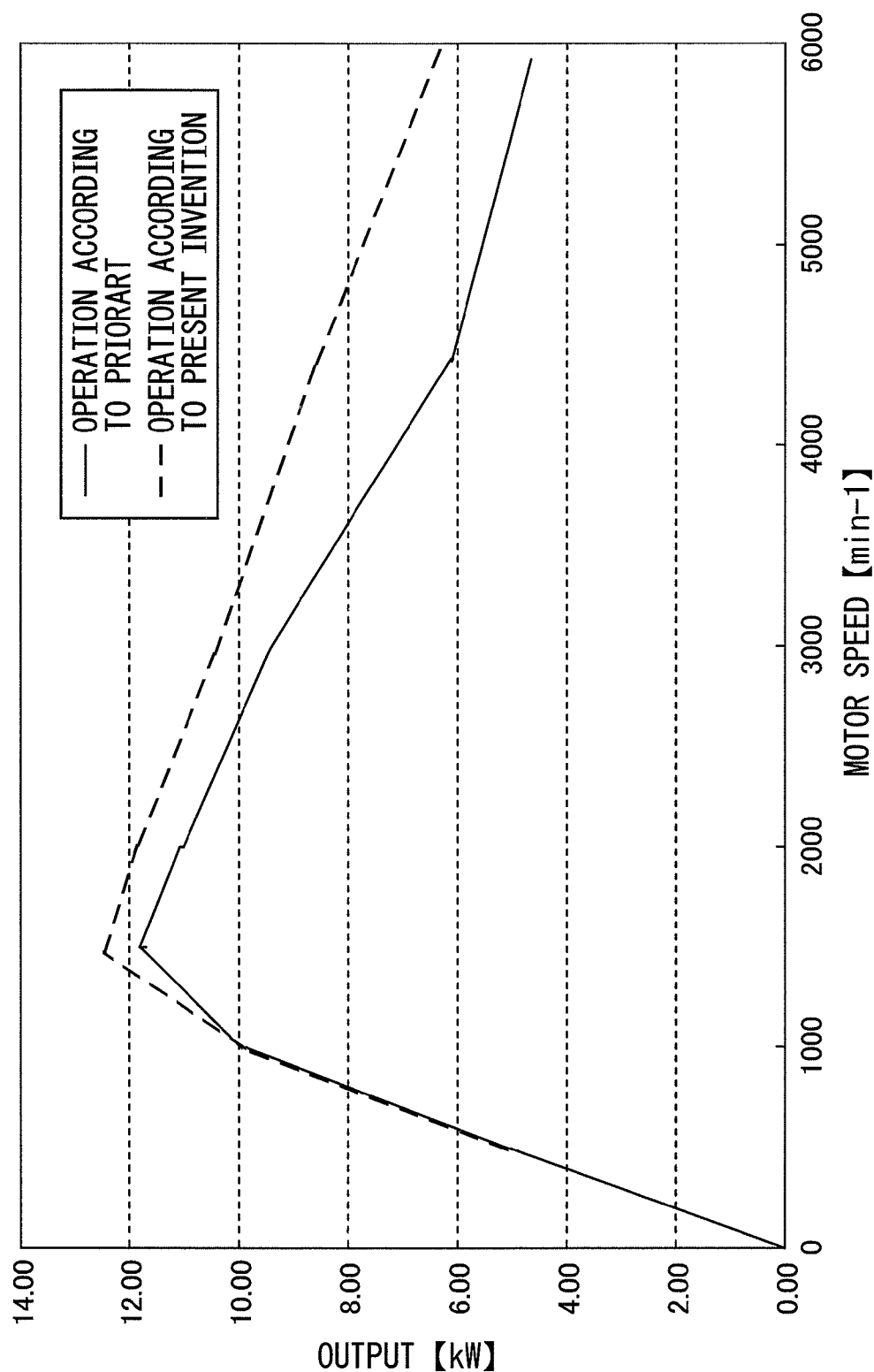
FIG. 3 is a graph explaining an effect of improvement of the present invention.

FIG. 3 shows the relationship between the motor speed and the output in an operation according to the related art in which the slip frequency estimation value ωŝ is not corrected and the relationship between the motor speed and the output in an operation according to the present invention.

In the art stated above, it was assumed that the motor speed ωr equals the motor speed command signal value ωrcmd. This assumption is true in a system in which a speed command signal value which changes in accordance with a certain time constant is provided. However, the assumption is not true in a system in which a speed command signal value which does not have a time constant is provided, since the speed command signal value does not correspond to the actual motor speed of the induction motor 10 when the induction motor 10 is in a state of acceleration or deceleration.

Therefore, in the embodiment, processing is carried out for correcting the slip frequency estimation value ωŝ if the speed command signal value changes in accordance with the time constant, while such processing is not carried out if the speed command signal value does not have the time constant and the induction motor 10 is in a state of acceleration or deceleration.

Figure 4:
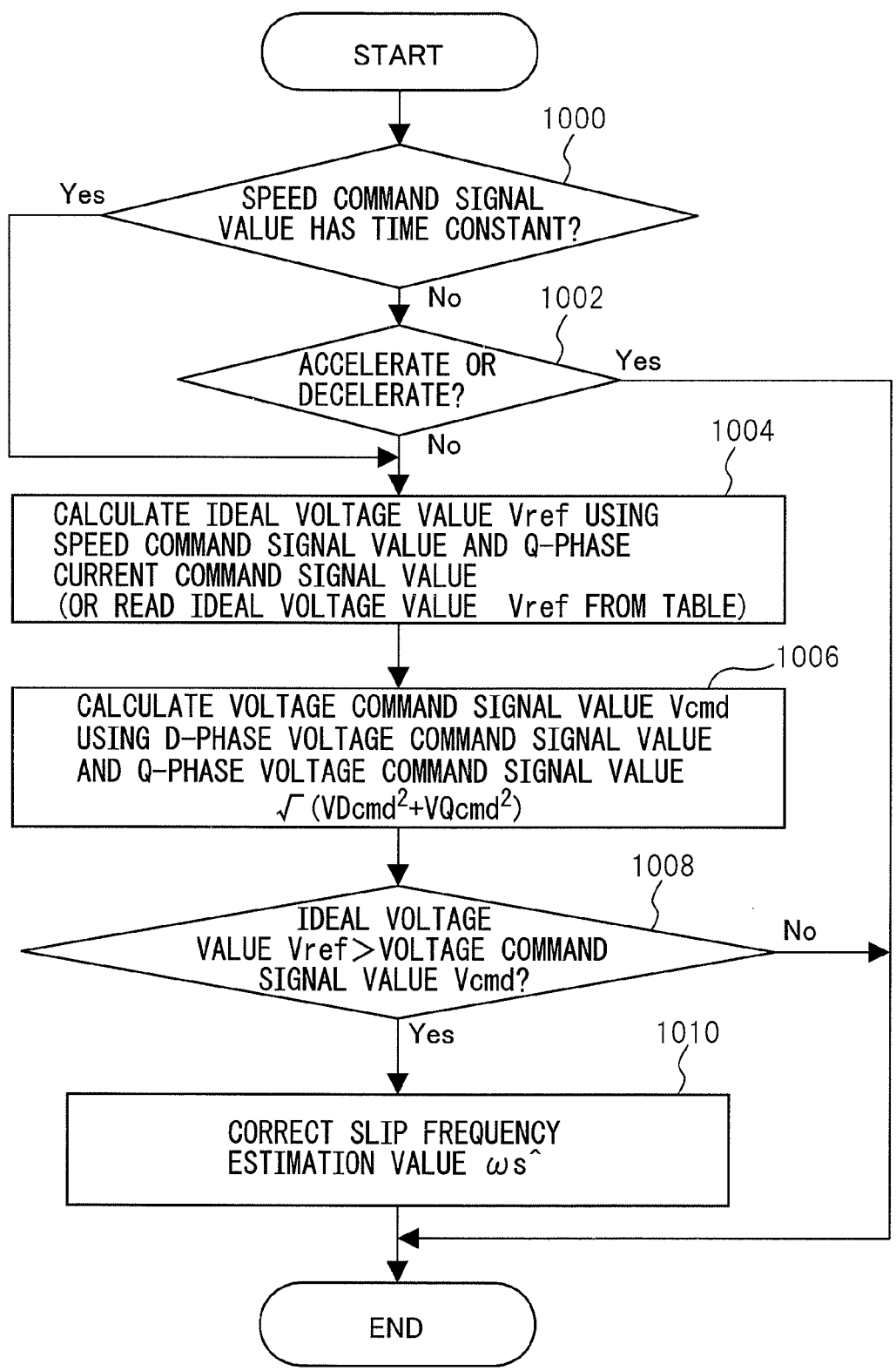
FIG. 4 is a flowchart showing one example of an operation of the present invention.

FIG. 4 is a flowchart showing how to carry out the processing stated above. In FIG. 4, first, the sensorless induction motor control device shown in FIG. 2 determines whether or not the motor speed command signal value ωrcmd has a time constant (Step 1000). If the motor speed command signal value ωrcmd does not have a time constant, the sensorless induction motor control device shown in FIG. 2 determines whether or not the induction motor 10 is in a state of acceleration or deceleration (Step 1002). If the induction motor 10 is in a state of acceleration or deceleration, this processing is ended. On the other hand, if the induction motor 10 is not in a state of acceleration or deceleration, the ideal voltage command signal value calculation unit 30' calculates the ideal voltage command signal value norm Vref using the motor speed command signal value ωrcmd and the Q-phase current command signal value IQcmd (Step 1004), while the actual voltage command signal value calculation unit 32 calculates the actual voltage command signal value norm Vcmd using the D-phase voltage command signal value VDcmd and the Q-phase voltage command signal VQcmd (Step 1006).

Next, the slip frequency correction unit 34 determines whether or not the ideal voltage command signal value norm Vref is larger than the actual voltage command signal value norm Vcmd (Step 1008). If the ideal voltage command signal value norm Vref is larger than the actual voltage command signal value norm Vcmd, the slip frequency correction unit 34 corrects the slip frequency estimation value ωŝ, then this processing is ended. On the other hand, if the ideal voltage command signal value norm Vref is not larger than the actual voltage command signal value norm Vcmd, this processing is ended immediately.

If, at Step 1000, the motor speed command signal value ωrcmd has a time constant, this routine skips Step 1002 and goes to Step 1004.

Figure 5:
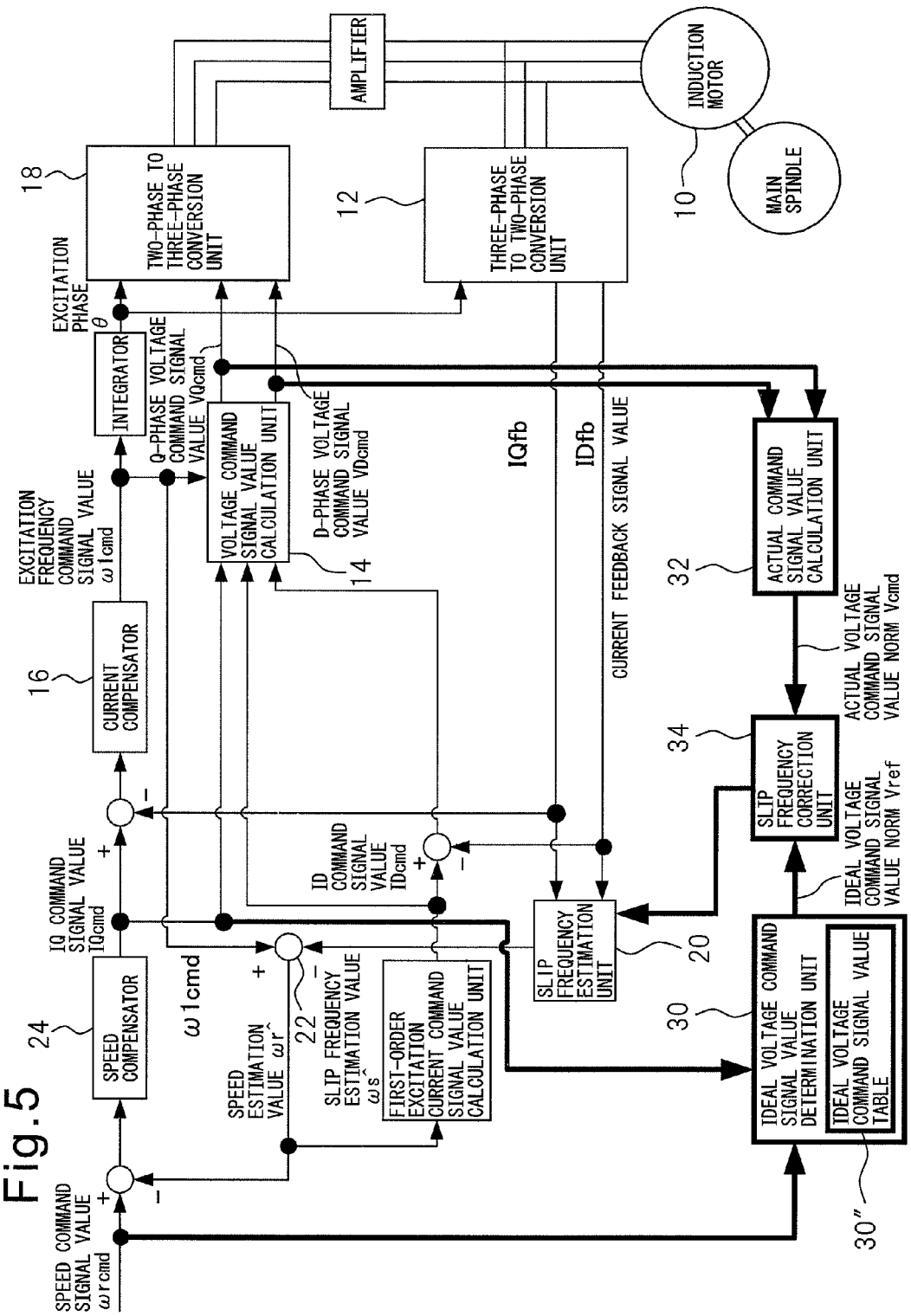
FIG. 5 is a diagram showing a configuration of a sensorless induction motor control device which has a function of correcting the slip frequency according to a second embodiment of the present invention.

FIG. 5 is a diagram showing a configuration of a sensorless induction motor control device which has a function of correcting the slip frequency according to a second embodiment of the present invention. In FIG. 5, the ideal voltage command signal value determination unit 30 has an ideal voltage command signal value table 30". The ideal voltage command signal value table 30" stores the measured voltage values of the induction motor 10 at storage positions determined by measured speeds of the induction motor 10 and Q-phase current values. The ideal voltage command signal value determination unit 30 can read the ideal voltage command signal value norm Vref by referring to the ideal voltage command signal value table 30" using the motor speed command signal value ωrcmd and the Q-phase current command signal value IQcmd.

The ideal voltage command signal value table 30" stores data relating to a variety of combinations of measured motor speeds, which are detected by a speed sensor provided on the induction motor 10, and Q-phase current values. Further, the ideal voltage command signal value table 30" may store an ideal voltage command signal value norm Vref obtained by calculation as stated above.

While the invention has been described with reference to specific preferred embodiments, it will be understood, by those skilled in the art, that various changes or modifications may be made thereto without departing from the scope of the claims.

The invention claimed is:

1. A sensorless induction motor control device, which has a function of correcting a slip frequency of a sensorless induction motor, for controlling a induction motor by estimating said slip frequency from a current flowing through windings included in said sensorless induction motor; wherein a Q-phase current command is calculated based on a difference between a speed estimation value, which is calculated using an estimation value of said slip frequency, and an externally supplied speed command and a D-phase voltage command and a Q-phase voltage command, which are used for controlling a voltage applied to said sensorless induction motor, are calculated using a Q-phase current command, characterized in that said sensorless induction motor control device comprises:

an ideal voltage command determination unit for determining an ideal voltage command using said speed command and said Q-phase current command;

an actual voltage command calculation unit for calculating an actual voltage command using a D-phase voltage command and said Q-phase voltage command; and a slip frequency correction unit for comparing said ideal voltage command with said actual voltage command and changing said estimation value of said slip frequency to smaller if said actual voltage command is smaller than said ideal voltage command.

2. The control device according to claim 1, wherein said slip frequency correction unit corrects said estimation value of said slip frequency using (slip frequency after correction)= (slip frequency before correction)*(actual voltage command)/(ideal voltage command) if said actual voltage command is smaller than said ideal voltage command.

3. The control device according to claim 1, wherein said slip frequency correction unit corrects said slip frequency only when a motor speed of said sensorless induction motor can be assumed to be identical to said externally supplied speed command.

4. The control device according to claim 2, wherein said slip frequency correction unit corrects said slip frequency only when a motor speed of said motor can be assumed to be identical to said externally supplied speed command.

5. The control device according to claim 1, wherein said ideal voltage command determination unit determines said ideal voltage command by a calculation using said externally supplied speed command, said Q-phase current command, and a motor circuit constant.

6. The control device according to claim 5, wherein said slip frequency correction unit corrects said estimation value of said slip frequency using (slip frequency after correction)= (slip frequency before correction)*(actual voltage command)/(ideal voltage command) if said actual voltage command is smaller than said ideal voltage command.

7. The control device according to claim 5, wherein said slip frequency correction unit corrects said slip frequency only when a motor speed of said motor can be assumed to be identical to said externally supplied speed command.

8. The control device according to claim 6, wherein said slip frequency correction unit corrects said slip frequency only when a motor speed of said motor can be assumed to be identical to said externally supplied speed command.

9. The control device according to claim 1, wherein said ideal voltage command determination unit determines said ideal voltage command by referring to a table which stores respective measured voltage values of said sensorless induction motor at respective storage positions determined by respective measured motor speeds of said sensorless induction motor and respective Q-phase current values, using respective externally supplied speed command and said respective Q-phase current command.

10. The control device according to claim 9, wherein said slip frequency correction unit corrects said estimation value of said slip frequency using (slip frequency after correction)= (slip frequency before correction)*(actual voltage command)/(ideal voltage command) if said actual voltage command is smaller than said ideal voltage command.

11. The control device according to claim 9, wherein said slip frequency correction unit corrects said slip frequency only when a motor speed of said motor can be assumed to be identical to said externally supplied speed command.

12. The control device according to claim 10, wherein said slip frequency correction unit corrects said slip frequency only when a motor speed of said motor can be assumed to be identical to said externally supplied speed command.

* * * * *